INVENTOR.
James J. Black.
BY Wood, Herron & Evans.
ATTORNEYS.

Oct. 10, 1961 J. J. BLACK 3,003,781
AIR SPRING VEHICLE SUSPENSION SYSTEM
Filed Jan. 9, 1958 6 Sheets-Sheet 5

INVENTOR.
James J. Black.
BY Wood, Herron & Evans.
ATTORNEYS.

Oct. 10, 1961 J. J. BLACK 3,003,781
AIR SPRING VEHICLE SUSPENSION SYSTEM
Filed Jan. 9, 1958 6 Sheets-Sheet 6

INVENTOR.
James J. Black.
BY
Wood, Herron & Evans.
ATTORNEYS.

United States Patent Office 3,003,781
Patented Oct. 10, 1961

3,003,781
AIR SPRING VEHICLE SUSPENSION SYSTEM
James J. Black, Cincinnati, Ohio, assignor to Trailmobile Inc., Cincinnati, Ohio, a corporation of Delaware
Filed Jan. 9, 1958, Ser. No. 707,985
13 Claims. (Cl. 280—104.5)

This invention relates to wheel suspension systems for semi-trailers and other vehicles which are equipped with tandem road wheels. The invention is particularly addressed to a tandem suspension which utilizes highly resilient air springs to provide the spring action and to distribute the weight load between the tandem axles.

One of the primary objectives of the invention has been to provide a compact structure utilizing opposed pairs of pivoted suspension levers or rockers arranged in tandem at opposite sides of the vehicle, each pair of suspension levers being biased by a single compressible air spring or cushion to provide the spring action and equalized weight distribution between the tandem axles.

Another objective has been to provide a compact suspension system so arranged that the air springs reside in an inboard position within an undercarriage and beneath the floor of the vehicle, the opposed rockers being connected to the tandem axles at outboard points below the air springs, thereby to increase the lateral stability of the vehicle with respect to the axles and ground.

A further objective has been to provide a tandem suspension system so arranged that each air spring is free to travel or float bodily in response to rocking motions of the tandem suspension levers, such that the tandem axles are free to be displaced in relative vertical directions as the tandem wheels pass over road obstructions. By virtue of the floating action, impact forces, which normally would act upon the vehicle body, are transmitted from one rocker through the compressible air spring to the opposed rocker; hence, the rockers coact to absorb impact forces, at least in part, to improve the spring action and roadability.

In general, the principles of the invention are embodied in a suspension system comprising opposed pairs of bell crank levers or rockers which are generally L-shaped as viewed from the side, the opposed levers being mounted in duplicate at opposite sides of the vehicle. As viewed from the side, the opposed bell-cranks comprise upright or vertical limbs residing substantially in parallelism with one another, and respective horizontal limbs extending outwardly in opposite directions from the lower ends of the vertical limbs. The tandem axles are joined to the outer swinging portions of the horizontal limbs and each opposed bell-crank lever is pivotally journalled upon respective trunnion or rock shafts which extend transversely across the undercarriage. The rock shafts provide transversely extended bearings which stabilize the base of each rocker laterally; therefore, each rocker individually absorbs any twisting forces which may be imparted to it by axle displacement. Each individual air spring is interposed in compression between the upper portions of the opposed vertical limbs. Accordingly, the weight load of the undercarriage is imposed upon the rock shafts and is carried through the horizontal limbs to the tandem axles, tending to swing the vertical limbs about the rock shafts toward one another. Otherwise expressed, each L-shaped lever individually provides a three-point suspension consisting of the point of rock shaft connection, the point of axle connection, and the point of reaction against the air spring. Since the air spring is interposed in compression between the vertical limbs, the weight load reacts against opposite ends of each air spring, such that the structure, in effect, provides individual spring suspension for each of the tandem wheels.

The present structure has the further advantage of locating the air springs in an elevated plane above the roadway surface in a position where they are protected from materials which normally collect upon the running gear of a vehicle. The semi-trailer for which the structure is intended is of the type in which the body of the vehicle overhangs the road wheels on opposite sides for maximum cargo capacity. The undercarriage in which the suspension system is mounted, is substantially less in width than the trailer body, and the axles extend transversely below the undercarriage. Running clearance is provided between the axles and undercarriage and between the wheels and floor to allow for maximum potential spring action.

By virtue of the suspension structure, the air cushions are nested compactly within the transverse confines of the undercarriage immediately beneath the vehicle floor in an area which normally is unused. On the other hand, the broad transverse bearing base of the rockers, as provided by the rock shaft, makes it possible to locate the horizontal limbs in an outboard position well beyond the centers of the air springs to stabilize the vehicle in the lateral direction. Briefly therefore, the suspension system provides lateral stability which is equal to or superior to that provided by conventional springs which are mounted in outboard position, while at the same time, it utilizes the carriage as a protective housing for the compactly mounted inboard air springs.

A further objective has been to provide a self-leveling apparatus which regulates the internal air pressure of the springs to sustain the vehicle at a predetermined standard height relative to the roadway, with substantially constant spring clearance, regardless of the weight load of the cargo which is loaded into the vehicle body. For regulating the air springs, the vehicle is provided with an air reservoir communicating with automatic height control valves, one for each air spring. Each valve responds automatically to displacement of the vehicle under static loading to increase or decrease the internal pressure of the air springs as cargo is loaded or unloaded. The independent action of the height control valves has the further advantage of maintaining equalized spring clearance at opposite sides by counteracting forces which act laterally against the body, such as unbalanced loading or external forces acting in a direction tending to tilt the body laterally relative to the axles. The reservoir which supplies air pressure to the springs is charged from the standard air brake equipment of the tractor; the reservoir retains its air supply after the tractor is uncoupled from the trailer, for example, at the loading dock. Accordingly, the self-leveling action prevails whether the trailer is uncoupled during loading or unloading or whether the vehicle remains coupled to the tractor.

The various features and advantages of the invention will be more clearly apparent to those skilled in the art from the following description taken in conjunction with the drawings.

General arrangement

Figure 1:
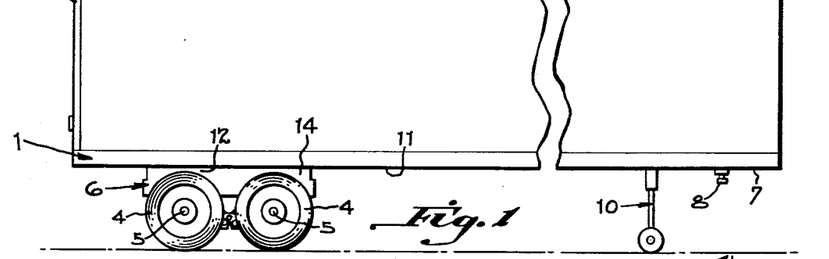
FIGURE 1 is a diagrammatic side view illustrating a typical semi-trailer equipped with the tandem suspension of this invention.

A typical semi-trailer incorporating the tandem air suspension is shown diagrammatically in FIGURE 1 to illustrate the principles of this invention. Since the construction of the semi-trailer, or other vehicle with which the air suspension may be utilized, is not pertinent to the invention, the details have been omitted from the drawings. In general, the semi-trailer comprises a main frame indicated generally at 1 of composite construction and including a vehicle floor. The trailer body or cargo housing, indicated generally at 2, is mounted on frame 1 and may include rearward doors, indicated at 3, for loading and unloading. The rearward portion of frame 1 is carried by the tandem road wheels 4—4 journalled on axles 5—5, the axles being yieldably carried by the air suspension system which is incorporated in a self-contained subframe or undercarriage indicated at 6. The undercarriage is rigidly joined to frame 1 as described later.

The forward portion of the trailer is provided with an upper fifth wheel 7 including a king pin 8. When the trailer is coupled to its tractor (not shown), the upper fifth wheel of the semi-trailer resides in facial engagement with a lower fifth wheel which is carried by the tractor. The fifth wheel of the tractor includes coupling jaws which establish a draft connection with the king pin 8. Accordingly, during road transport, the weight load of the rearward portion of the semi-trailer is supported upon the tandem air suspension, while its forward portion is supported by the fifth wheel of the tractor. When the trailer is uncoupled from the tractor, as shown in FIGURE 1, its forward end is supported by a retractable landing gear or prop structure indicated generally at 10. The trailer fifth wheel and prop are conventional and are not shown in detail.

The frame 1 and trailer body 2 overhang the wheels 4 laterally on opposite sides (FIGURE 4), and the lower surface 11 of frame 1 is supported by the air suspension system at a sufficient elevation above the road wheels as at 12 for normal spring action during road transport. This clearance is maintained regardless of loading, by the self-leveling apparatus, as described later.

In order to illustrate clearly the principles of this invention, two typical air suspension systems are disclosed in the drawings. Each embodiment comprises opposed pairs of tandem suspension levers or rockers biased by individual air springs, the two air springs residing within the confines of the undercarriage. In the first embodiment shown in FIGURES 1–12, the opposed suspension levers are of sectional strut construction. In the second embodiment shown in FIGURES 13–19, the opposed levers are substantially of one-piece metal plate construction. Although the one-piece construction is preferred, by virtue of its simplicity, the sectional strut construction also represents a practical version of the invention.

Sectional tandem structure

Figure 2:
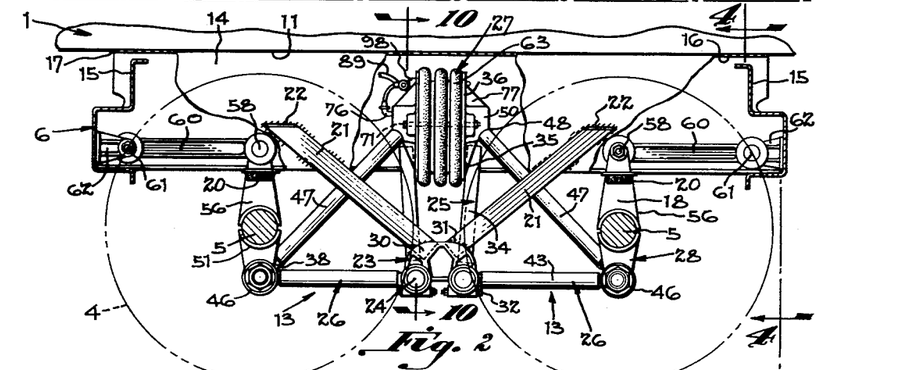
FIGURE 2 is an enlarged fragmentary side view taken from FIGURE 1 with parts broken away to illustrate more clearly the tandem suspension structure.
Figure 3:
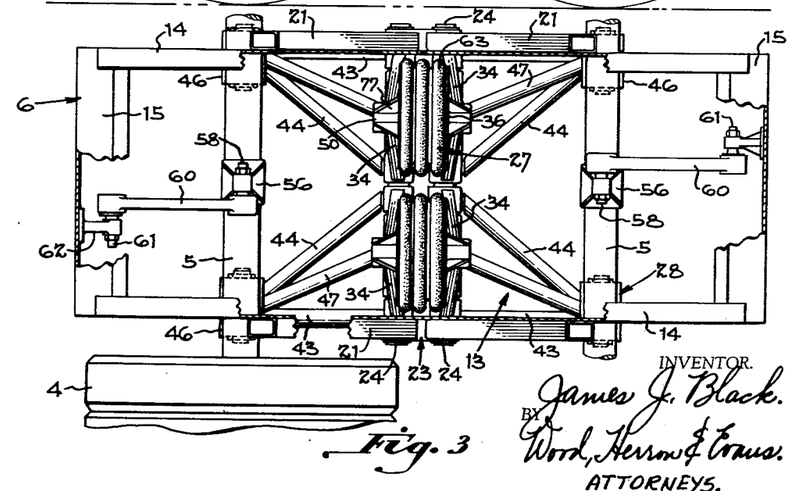
FIGURE 3 is a top plan view projected from FIGURE 2 with parts broken away, further illustrating the suspension structure.
Figure 4:
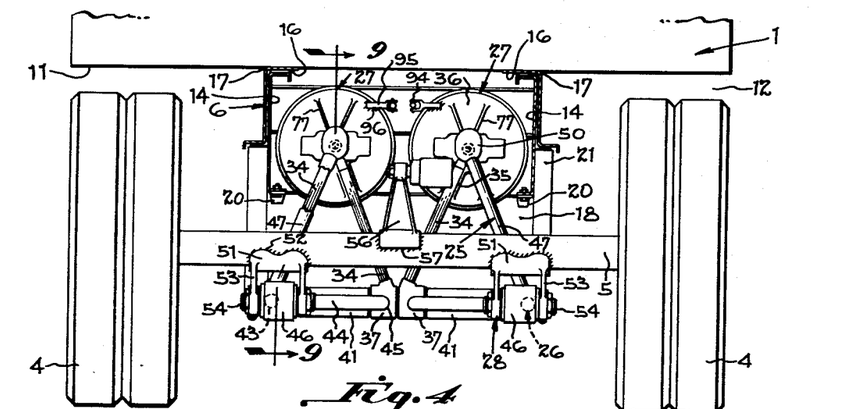
FIGURE 4 is a cross sectional view taken along line 4—4 of FIGURE 2.

Referring to FIGURES 2 and 3, the sectional suspension system comprises two opposed pairs of bell-crank levers or rockers, indicated generally at 13—13, the opposed levers being in duplicate at opposite sides of the undercarriage, as viewed in FIGURE 3. The undercarriage 6, to which the opposed L-shaped levers 13 are pivoted, comprises a pair of side plates 14—14 and a pair of cross members 15—15, these members being generally channel-shaped in cross section. The undercarriage is of rigid construction, its members preferably being welded to one another to provide a box-like structure. As shown in FIGURE 4, the side plates 14 may include load-bearing plates 16 suitably joined to the side plates of the undercarriage at opposite sides, the main trailer frame 1 being suitably joined as at 17 to the plates 16—16.

The undercarriage resides beneath the center portion of frame 1 (FIGURE 4), such that the side portions of the trailer body overhang the undercarriage and extend above the wheels 4 on opposite sides. It will be noted in this view that there is provided a running clearance 18 between the lower edge of the undercarriage and axle 5 which is substantially equal to the clearance 12 previously noted between the wheels 4 and lower surface of frame 1. To prevent any contact between the frame 1 and wheels, rubber bumpers 20—20 of a conventional type are mounted beneath the undercarriage on opposite sides in position to contact the axles in case of abnormal axle deflection during road transport.

As shown in FIGURE 2, each side plate 14 of the undercarriage includes a pair of load-bearing truss bars 21—21 arranged in V-formation, the upper portions of the bars 21 being welded as at 22 to the side plates. Attached to the adjacent lower ends of the truss bars is a bearing bracket 23; these brackets at opposite sides support the transverse trunnions or rock shafts 24—24.

Each L-shaped rocker lever 13 comprises a vertical limb 25 and a horizontal limb 26 (FIGURE 9), the levers being pivotally journalled on the rock shafts 24 at the juncture of the vertical and horizontal limbs. Each pair of tandem levers is biased by an air spring indicated generally at 27 which is interposed in compression between the upper ends of the opposed vertical limbs 25. The tandem axles 5—5 are joined by shackles 28 to the outer swinging ends of the horizontal limbs 26. Thus, as viewed in FIGURE 2, the weight load which is imposed on the undercarriage is transmitted to the rock shafts 24 and carried through the horizontal limbs 26 to the axles, tending to rock the horizontal limbs 26 upwardly and to swing the vertical limbs 25—25 toward one another, such that the entire load is yieldably biased by the compressible air springs 27 at opposite sides.

Referring to FIGURE 4, it will be observed that the two air springs 27 reside compactly in side-by-side relationship in an inboard position between the side plates 14—14 of the undercarriage, while the horizontal limbs 26 are displaced laterally in outboard positions from the centers of the air springs. The shackles 28, through which the horizontal limbs are joined to the axles, are thus substantially outboard to provide maximum lateral stability, the position of the shackles 28 corresponding approximately to the normal location of conventional leaf springs.

As described later in detail, the rock shafts 24 journal each rocker upon a broad lateral base to resist any twisting forces which are developed by reason of the relative lateral displacement of the horizontal limbs and air cushions. It will also be observed in FIGURE 4, that the offset construction of the rockers permits the air cushions 27 to be nested compactly within the undercarriage where they are protected during service. As noted earlier, the air springs are completely unattached with respect to the undercarriage; hence, each air spring is free to travel or float longitudinally, permitting the tandem axles to be freely displaced relative to one another in vertical directions as the vehicle passes over road obstructions.

Figure 10:
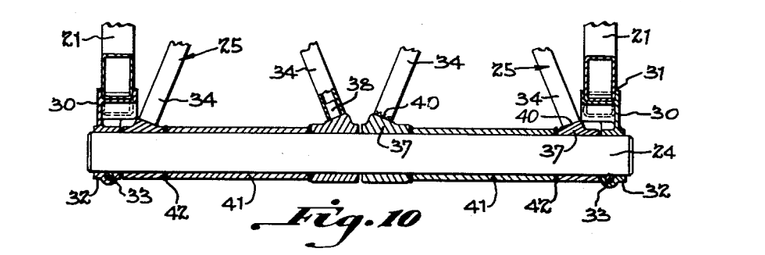
FIGURE 10 is a sectional view taken along line 10—10 of FIGURE 2, detailing the rock shaft and bearing structure of one of the tandem rockers.

Described in detail with reference to FIGURES 2 and 10, each rock shaft bearing bracket 23 comprises an inverted U-shaped housing 30 socketed to receive the lower ends of rigid truss bars 21, the bars being welded as at 31 to the bracket housing. Each bracket 23 includes spaced hubs 32—32 bored to receive the opposite ends of the parallel rock shafts 24. The rock shafts are rigidly locked in the hubs by means of bolts 33 passing through the lower portion of each hub.

Figure 9:
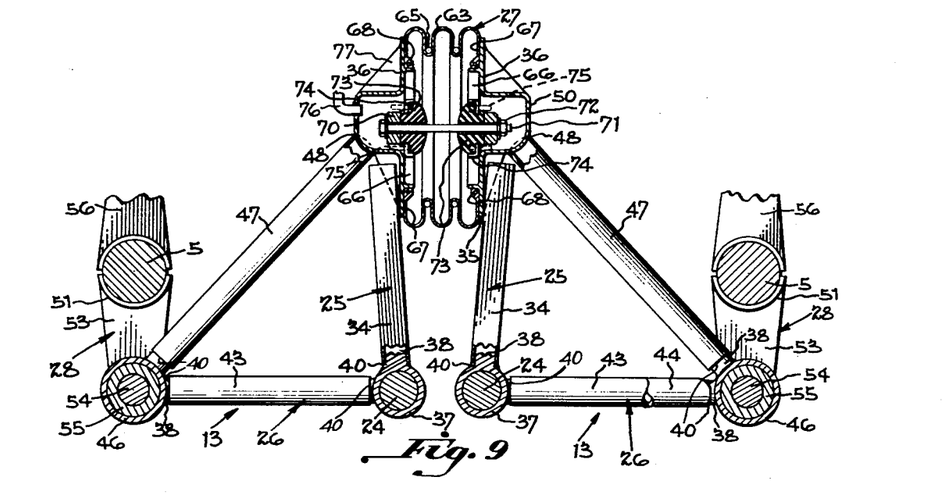
FIGURE 9 is an enlarged sectional view taken along line 9—9 of FIGURE 4, detailing the tandem rockers and air spring.

Referring to FIGURES 4 and 9, the vertical limbs 25 of each L-shaped rocker consist of a pair of bars 34—34 residing in A-formation, the apex portion of the bars 34 being welded as at 35 to the head 36 of the air spring, as described later in detail. The bars 34 preferably are square in cross section and the lower end of each bar includes a bearing collar 37, the bearing collars being journalled on the trunnion shaft 24. As shown in FIGURES 9 and 10, each bearing collar 37 includes a stud 38 telescopically fitted into the lower end of the bar 34 and welded as at 40. Each pair of bearing collars 37 is joined in spaced relationship by a sleeve 41 loosely fitted on the rock shaft with its opposite ends welded as at 42 to the bearing collars 37.

The laterally spaced bearing collars 37—37 of each L-shaped lever or rocker, combined with the sleeve 41, creates a composite bearing base of rigid construction for stabilizing the levers laterally along the rock shaft, with the twisting forces distributed along the shaft. The two composite bearing assemblies reside in side-by-side relationship along the rock shaft and each is free to rock relative to the other to provide independent operation of each L-shaped lever assembly.

The horizontal limb 26 of each L-shaped lever is generally triangular as viewed from above (FIGURE 3), comprising in each case a main horizontal bar 43 and a diagonal strut or brace 44, both of which are cylindrical. The main horizontal bar 43 is joined to the outer bearing collar 37, which is provided with a stud 38 fitted into the end of bar 43 and welded as at 40 (FIGURE 9). The diagonal brace 44 has its inner end similarly joined as at 45 (FIGURE 4) to a stud (not shown) of the inner or companion bearing collar 37. The bars 43 and 44 reside in a common horizontal plane with their outer ends converging to a shackle collar 46 which is pivotally connected to the shackle 28 as explained later. The shackle collar 46 includes two horizontal studs, as indicated at 38 in FIGURE 9 to receive the horizontal bars 43 and 44 which are similarly welded to the studs as at 40.

In order to reinforce each L-shaped lever in the vertical plane, as viewed in FIGURE 9, each is provided with a second diagonal strut or brace 47, also formed of cylindrical tube stock. The upper end of diagonal strut 47 abuts the housing 50 of head 36 and is welded thereto at 48. The lower end of the diagonal strut is fitted upon a third stud 38 of shackle collar 46 and is welded thereto as at 40. As best shown in FIGURE 3, each diagonal strut 47 is inclined downwardly and outwardly from the center of the air cushion to which it is attached, to the shackle collar 46 which resides in outboard position. It will be noted in FIGURE 9, that the diagonal strut 47, combined with the composite vertical and horizontal limbs 25 and 26, completes a rigid triangular frame; hence, impact forces acting upwardly through the axles are resisted in compression by each diagonal strut 47.

Referring to FIGURE 4, each shackle 28 comprises a saddle 51 welded as at 52 to the axle and having spaced clevis arms 53 projecting downwardly from the axle. Each shackle collar 46 resides between the arms 53 and is pivotally connected to them by a shackle bolt 54 of conventional design. A suitable bushing 55 (FIGURE 9) is fitted into each collar 46 according to conventional practice.

In order to lock the axles 5 against rotary forces, such as those developed in braking, and to guide the axles for vertical motion, each axle is provided with a radius arm 56 welded as at 57 to the center portion of the axle (FIGURES 2 and 4). The radius arm projects upwardly and its upper end is pivoted as at 58 to a radius link 60. The opposite end of the radius link is pivoted as at 61 to a bracket 62 which is attached to the cross member 15 of the undercarriage. This structure is duplicated at opposite ends of the undercarriage, the two links 60 projecting outwardly in opposite directions, as viewed in FIGURE 2. Since the radius arms and links are pivotally connected to the undercarriage, they resist turning forces which are transmitted to the axles; on the other hand, the articulated connections permit the axles to move along vertical arcuate paths without restriction.

The air springs 27—27 may be of conventional design. In the present example (FIGURE 9), each air cushion comprises a cylindrical bellows 63 formed from pliable material, such as tough fabric which is suitably coated with rubber or the like to render it air-tight. Each bellows is shaped to provide a series of accordion-type folds which are delineated by metal rings 65. The opposite ends of the bellows are facially seated and sealed against the heads 36—36. Each head 36 includes an internal cylindrical flange 66 and the opposite end walls 67 of the bellows each include an opening delineated by a respective annular rim 68 embracing the flange 66.

Each head 36 includes an internal fixed boss 70 residing within its housing 50. Slidably passing through the opposed bosses 70—70 is a rebound bolt 71 including a nut 72. Bolt 71 limits the relative outward motion of the opposed heads 36—36 as indicated in FIGURE 9. The rebound bolt passes through a pair of opposed bumpers 73—73 formed of rubber and held in position by retainer caps 74 which are secured to the heads 36 by bolts 75. The bumpers 73 are arranged to engage one another to support the load if for any reason the air spring should lose its internal air pressure. They also prevent the heads 36 from contacting one another in the event of abnormal impact on the rockers during road transport.

Air pressure is admitted to each air spring through one of the heads 36 which is provided with a fitting 76 communicating with the interior of the spring through housing 50. The self-leveling apparatus includes air conduits in communication with the fittings 76 of each air spring, as explained later. Each head further includes a series of radial ribs 77, which extend from the outer face of the head to the sides of the housing 50 for stiffening purposes (FIGURE 4). As explained earlier, the diagonal struts 44 are welded as at 48 to the respective housings; hence, the ribs 77 reinforce the heads 36 against impact forces which are transmitted by the diagonal struts.

Figure 11:
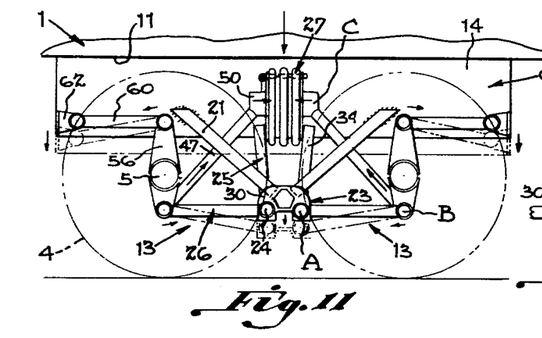
FIGURES 11 and 12 are diagrammatic views illustrating the spring action of the tandem suspension system.
Figure 12:
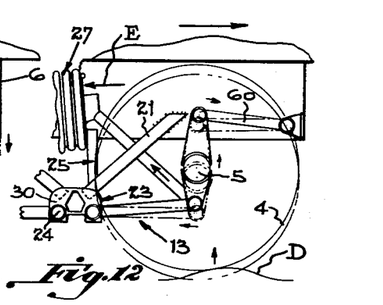

The normal springing action of the tandem suspension system is illustrated diagrammatically in FIGURES 11 and 12. As shown by the vertical arrow in FIGURE 11, the weight load supported by the undercarriage 6 tends to deflect the undercarriage and rock shafts downwardly to the position indicated in broken lines. The action of the radius arms 56 and links 60, under downward deflection, is also indicated by the broken lines. Each L- shaped lever 13, as indicated in the diagram, provides a three point suspension, the rock shaft 24 providing point A, the shackle bolt 54 providing point B, and the air spring connection providing point C. The weight load of the trunnion shafts 24 is thus imposed upon both L-shaped levers, tending to rock the L-shaped levers about the trunnion shafts and shackle bolts toward one another to compress the air spring 27 and to distribute the weight load equally to both tandem axles. It will also be understood that the L-shaped levers at opposite sides of the vehicle are free to rock independently of one another; therefore, each wheel is individually suspended to improve the spring action.

The floating action of the individual air springs is illustrated diagrammatically in FIGURE 12. With the vehicle travelling in the direction indicated by the arrow, the leading wheel, in passing over an obstacle D, will be deflected upwardly from the position shown in broken lines to the position shown in full lines. This motion rocks the L-shaped lever and air cushion in the direction indicated, the impact forces being partially absorbed by the compressive action of the air springs. However, the force is also transmitted, at least in part, to the companion rocker due to the bodily motion of the air spring in that direction, as indicated by the arrow E. Accordingly, the impact force generated in passing over the obstacle is substantially absorbed by the combined compressive and floating action of the air spring to improve the spring action of the vehicle.

*Height control apparatus*

As noted earlier, the height control apparatus maintains the vehicle body at a standard level by increasing or decreasing the internal air pressure of the air springs in response to changes in loading thereby preserving the normal running clearance for the axles and wheels. The self-leveling apparatus is effective whether the vehicle is uncoupled at the dock (FIGURE 1) or whether it remains coupled to the tractor during loading or unloading. When uncoupled, air pressure is supplied to the air springs from the air reservoir, indicated generally at 78 in FIGURE 5; upon being coupled, the air reservoir is interconnected with the air pressure equipment of the tractor. Accordingly, air pressure, which may have been expended during loading, is replaced when the tractor is coupled to the semi-trailer. It will be understood that the two air springs are controlled by individual self-leveling valves, so arranged that the vehicle body is levelled laterally relative to the running gear in the event that the cargo load is not evenly distributed across the body, or in the event that external forces cause lateral deflection of the body relative to the running gear.

In the present disclosure, the vehicle braking system is utilized to supply air pressure to the spring suspension and height control apparatus. Since the air-operated braking system is conventional and well known in the art, the details have been omitted from the disclosure. In general (FIGURE 5), the air brake system includes a service line 80 which is coupled to the tractor when the vehicle is in transit. The standard braking system also includes an emergency air line 81, also coupled to the tractor, which supplies air pressure to the brake reservoir 82 and also to the suspension reservoir 78. The service line 80 and emergency line 81 both lead to a relay valve 83. Relay valve 83 directs air pressure from the emergency line 81 to the brake reservoir 82. It also operates in relay fashion in response to air pressure transmitted through service line 80 to direct air pressure from brake reservoir 82 to the trailer service brakes which are mounted on the axles 5. Relay valve 83 has the additional function of directing air to the trailer brakes to set them in case the air supply fails in emergency.

Figure 5:
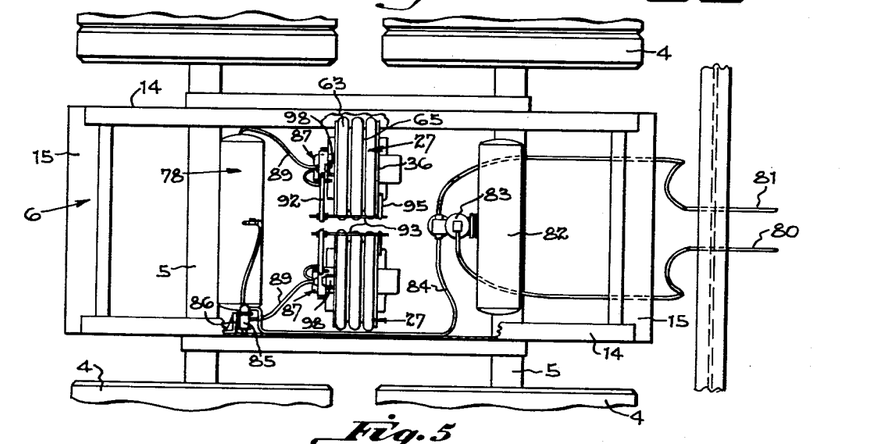
FIGURE 5 is a top plan view of the undercarriage with parts of the suspension system omitted to more clearly illustrate the height control apparatus.

The suspension reservoir 78 is supplied with air pressure by way of line 84 which leads from relay valve 83 to the reservoir 78. Interposed in line 84 is a pressure responsive valve 85 supported by a bracket 86. Pressure responsive valve 85 is of a standard type which opens under a predetermined back pressure to admit air to the suspension reservoir. Thus, valve 85 permits the suspension tank 78 to be charged only after the brake reservoir 82 is charged to a predetermined safe operating pressure. From the suspension reservoir 78, air is supplied to the individual air springs by way of the supply lines 89—89, each spring having a height control valve 87 which is interposed in its supply line 89. The valves 87 are in communication with the supply fittings 76. Since the air springs move relative to the undercarriage, the supply lines 89—89 are in the form of flexible conduits.

Figure 6:
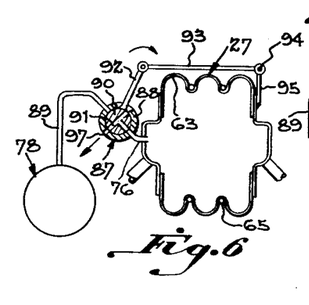
FIGURES 6, 7 and 8 are diagrammatic views illustrating the operation of the height control apparatus.
Figure 7:
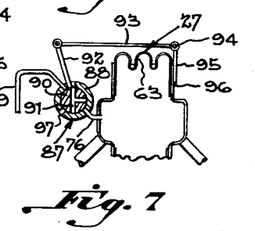
Figure 8:
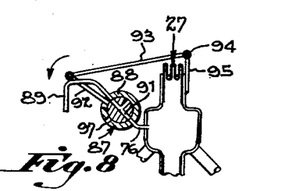

The height control valves are of conventional design and the structural details have been omitted; the operation of the valves is illustrated diagrammatically in FIGURES 6–8. Described generally with reference to FIGURE 6, each valve comprises a casing 88 having a core element 90 which is represented diagrammatically as a rotor having a T-shaped three-way air passageway 91. As shown in FIGURES 2 and 5, the valve casing 88 is attached by a bracket 98 to one head 36 of the air spring, and the valve includes a swinging arm 92, which is connected to the core element 90 for actuating it. A control rod 93 is pivotally connected to the swinging end of arm 92 and the opposite end of the rod is pivotally connected as at 94 (FIGURE 4) to a clevis element 95 which is welded as at 96 to the opposite head 36.

The position of the parts of FIGURE 6 illustrates the action of the valve when the internal pressure of the air spring is being reduced, for example, as the vehicle is being unloaded. It will be understood, that as the weight load decreases, the air pressure trapped within the spring will cause it to expand. The expanding air spring, acting through the opposed L-shaped rockers, tends to elevate the body above its normal axle clearance. However, as the air spring expands, the control rod 93 swings the arm 92 in the direction indicated by the arrow, causing the valve core 90 to rotate to the exhaust position shown. In this position, air pressure flows from the air spring by way of the fitting 76, through the three-way passage 91 and through the open exhaust port 97 of casing 88 to the atmosphere, thus allowing the air spring to contract. When the vehicle body reaches its standard elevation, core element 90 will have been rotated to the position shown in FIGURE 7, closing the port 97 and thus sealing off the air spring with the vehicle supported at its normal level.

When the air spring is compressed beyond its normal length, for example during loading (FIGURE 8), the control rod rotates the valve core 90 to a position in which communication is established from the port of supply line 89 to the port which communicates with the fitting 76. In this position, the exhaust port 97 is closed. This causes the air spring to be expanded to its normal length, at which point the valve core is shifted back to closed position (FIGURE 7).

It will be noted that the two self-leveling valves operate independently of one another, such that two air springs act not only to preserve the standard height of the body but also to maintain equalized spring clearance at opposite sides of the vehicle. For example, if the cargo is unevenly distributed to cause one air spring to be compressed to a greater extent than the other, then the valve of that spring will open and expand it, thereby to equalize the axle and wheel clearance at opposite sides. This action will also prevail in response to external forces tending to spring the body in the lateral direction sufficiently to decrease the normal wheel and axle clearance. On the other hand, the height control valves are not responsive to momentary actuation which occurs, for example, in passing over normal roadway obstructions. Under such conditions, the natural flow rate of the air into the spring is too slow to create any substantial change in vehicle level. Because of this automatic operation, the valves periodically discharge any excess pressure which may additively be supplied to the springs during successive impacts during road transport.

The supply lines 80 and 81 are provided with plug-in couplers of conventional design (not shown) for convenient interconnection with mating couplers of the tractor air supply system. These couplers are interconnected by the operator when the tractor is coupled to the semitrailer and are disconnected when it is uncoupled. The coupling elements include automatic valves which close when the lines 80 and 81 are uncoupled, such that the air pressure is trapped in the reservoirs 78 and 82 to supply the self-leveling apparatus. These valves open automatically when the supply lines are again coupled to the tractor, so as to replenish the reservoirs before the vehicle is placed in highway service.

*One-piece rocker construction*

Figure 13:
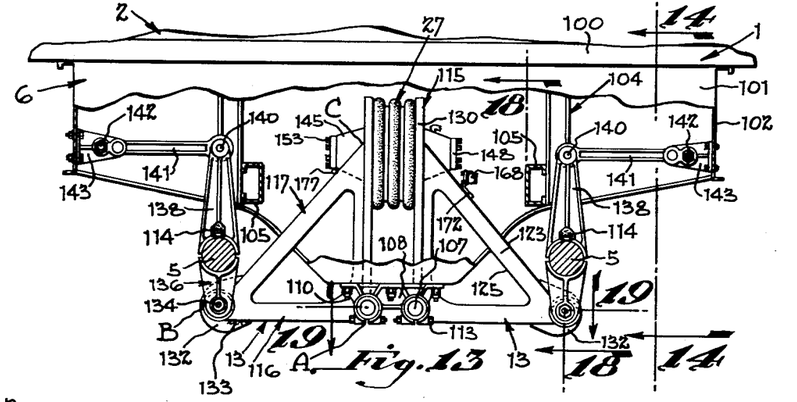
FIGURE 13 is a fragmentary side view partially in section similar to FIGURE 2, showing a tandem air spring suspension which utilizes L-shaped levers or rockers of one-piece plate construction.
Figure 14:
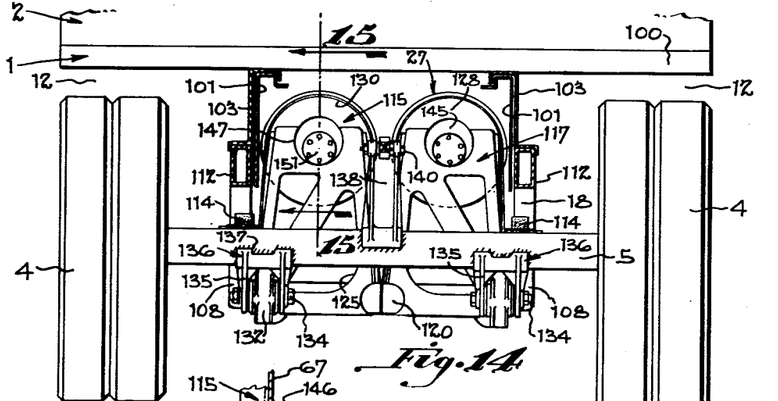
FIGURE 14 is a sectional view taken along line 14—14 of FIGURE 13.

The second embodiment of the invention, shown in FIGURES 13–19, involves the same operating principles as the strut type described above. The structure differs primarily in the specific construction of the L-shaped rockers and in certain other features, as described later. As shown in FIGURES 13 and 14, the main trailer frame 1 is mounted on an undercarriage 6 generally similar to the structure described earlier. The undercarriage includes opposed rockers indicated generally at 13 at opposite sides, each pair being biased by an air spring indicated generally at 27.

Figure 15:
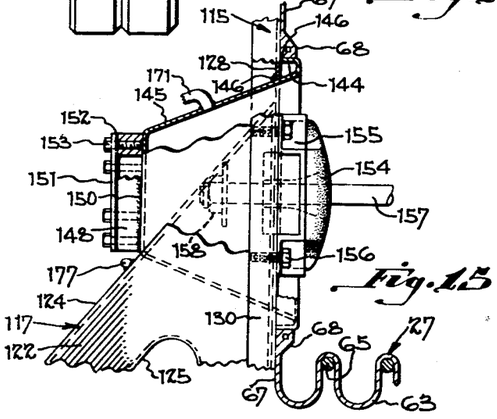
FIGURE 15 is an enlarged fragmentary sectional view taken along line 15—15 of FIGURE 14, detailing a portion of one of the air springs and rocker to which it is joined.
Figure 16:
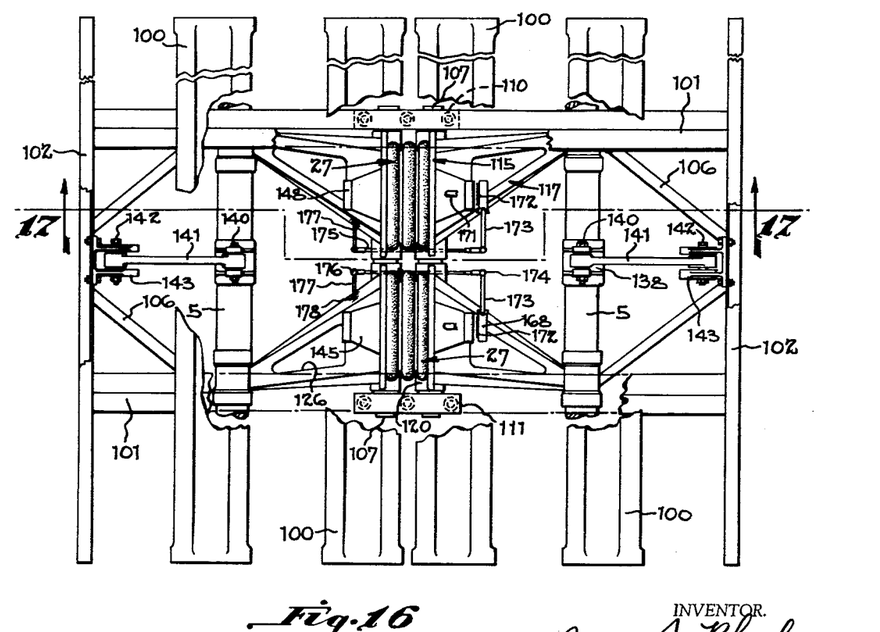
FIGURE 16 is a top plan view of the undercarriage and suspension system, similar to FIGURE 3.

As shown in FIGURE 16, the main frame 1 of the trailer body includes a series of transverse beams 100, of U-shape cross section, extending for the full width of the trailer body and supporting its floor and side walls. Referring to FIGURES 14–16, the undercarriage comprises a pair of side plates 101 and 101 extending longitudinally of the undercarriage, the opposite ends of the side plates being joined by cross beams 102 extending for the full width of the trailer body. The side members and cross members of the undercarriage are generally U-shaped in cross section and are joined together by welding to provide a rigid structure. Each side plate includes a load-bearing plate 103 joined to the main frame of the trailer body.

Figure 17:
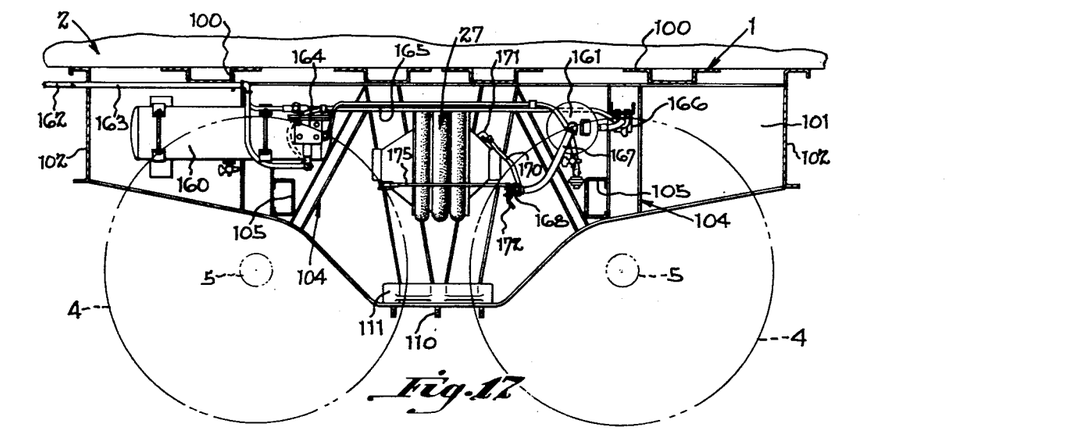
FIGURE 17 is a sectional view taken along line 17—17 of FIGURE 16, illustrating the height control apparatus and air supply of the suspension system, the tandem suspension structure being omitted to clarify the view.

In order to clarify the disclosure, the rockers 13 and associated parts have been omitted from FIGURE 17. As shown in this view, the side members 101 of the undercarriage are reinforced by an internal truss work indicated generally at 104. The several truss members are welded directly to the internal surface of the side plates 101 and their opposite ends seat against the upper and lower flanges of the side plates. The side plates may be reinforced laterally by cross members 105 having their opposite ends welded to the side plates. The undercarriage may also include diagonal braces 106 at opposite ends (FIGURE 16) for rigidifying the structure.

The rock shafts or trunnions 107—107 have their opposite ends carried in respective shaft support blocks 108, one at each side (FIGURE 13). Each shaft support block is attached by nuts to the studs 110 (FIGURE 17) which project from respective load-bearing blocks 111, each load-bearing block being welded to the side plate structure 101 of the undercarriage. As shown in FIGURE 14, an external truss structure 112, secured to each side plate 101, rises upwardly from the load-bearing blocks 111. The opposite ends of the rock shafts are non-rotatably locked to the shaft support blocks 108 by means of bolts 113 (FIGURE 13) passing through the lower portion of the shaft support blocks. The respective rockers 13 are mounted individually upon the rock shafts for rocking motion as described below.

As best shown in FIGURE 14, the rockers 13 rise upwardly from the rock shafts with their upper portions residing within the confines of the undercarriage and with the air springs 27 located in side-by-side relationship within the undercarriage. As shown in this view, the vehicle body overhangs the undercarriage and the spring clearance 12 and 18, as described above, is provided between the wheels 4 and axles 5. Each axle is also provided with rubber bumpers 114 residing beneath the lower edges of the undercarriage.

As viewed from the side (FIGURE 13), each rocker is generally triangular and each provides a three-point suspension consisting of the rock shaft connection (point A), the axle connection (point B), and the point of reaction against the air spring (point C). In general, each rocker is of rigid box-like construction providing a vertical limb 115, a horizontal limb 116 extending at right angles from the vertical limb, and a diagonal strut portion 117 joined to the two limbs for reinforcement. As explained later in detail, each rocker is fabricated from plate stock and is of rigid welded construction. As viewed from above (FIGURE 16), the vertical limb portion 115 of each rocker is substantially equal in width to the diameter to the air spring, the opposite ends of the air springs being seated directly against the upper portion of the opposed horizontal limbs. The diagonal strut portion 117 and horizontal limb portion 116 both have a corresponding taper forming a tail piece which is pivotally joined to the axle by shackle means, as described later. It will be understood at this point, that the rock shafts 107 provide transversely extended bearings and that each rocker is journalled along the rock shaft and thereby stabilized laterally beneath its air spring. On the other hand, the tail piece, which is shackled to the axle, is located in an outboard position with respect to the air spring to impart lateral stability to the connection between the undercarriage and axle.

Described in detail (FIGURES 18 and 19), the horizontal limb portion 116 comprises a bottom plate 118 which is tapered longitudinally as viewed from above (FIGURE 19), having at its forward portion a sleeve 120 which is journalled for rocking motion upon the rock shaft 107. The forward portion of plate 118 is welded as at 121 to the sleeve. The plate 118 includes side walls 122 and 123 rising upwardly, the upper edges of the side walls being joined to a top plate 124 which forms the diagonal strut portion 117. In order to reduce weight, the side walls include the openings 125, and the top and bottom plates each include a similar opening 126.

Figure 18:
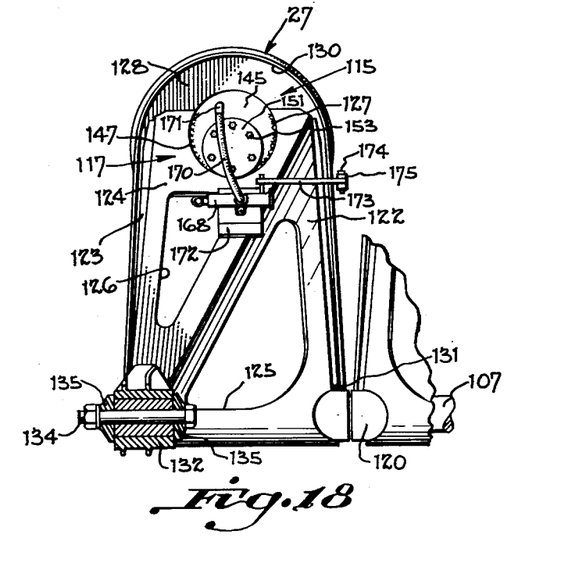
FIGURE 18 is a sectional view taken along line 18—18 of FIGURE 13, detailing the structure of one of the rockers.
Figure 19:
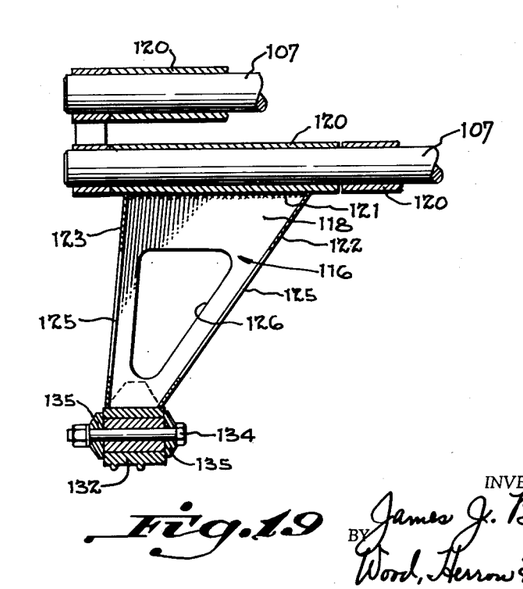
FIGURE 19 is a sectional view taken along line 19—19 of FIGURE 13, detailing the rock shaft bearing of one of the rockers.

The forward edges of the side plates are welded as at 127 to a vertical plate 128 which forms the vertical limb 115 of the rocker. The vertical plate 128 is reinforced by a peripheral flange 130, and its lower edge is welded as at 131 to the sleeve 120 which is journalled on the rock shaft.

The outer or swinging end of the rocker is provided with a yoke-shaped shackle bearing 132 which is welded as at 133 to the bottom plate 118 and top plate 124 (FIGURE 13). The shackle bearing 132 is journalled upon a shackle bolt 134 carried by the spaced limbs 135 of a shackle 136 which is welded as at 137 to the axle 5 in an outboard position with respect to the air spring (FIGURE 14).

The axle is locked against rotation by a radius arm 138 welded to the center of the axle, similar to the structure described earlier. The upper end of the radius arm is pivotally connected as at 140 to a radius link 141. The outer end of link 141 is pivotally connected as at 142 to the bracket 143 which is secured to the cross member 102 of the undercarriage. As shown in FIGURE 13, the links 141 at opposite ends of the undercarriage project outwardly in opposite directions; the articulated connection thus locks the axles against rotation and permits relative axle motion in a generally vertical arc about the rock shafts 107. The weight load carried by the rock shafts and transmitted to the shackles thus tends to swing the opposed rockers toward one another, this force being biased by the air spring 27, as described earlier.

As shown in FIGURE 15, each air spring 27 is similar to the structure described earlier (FIGURES 1–12), each comprising a series of cylindrical accordion folds 63 delineated by retainer rings 65. The opposed end walls 67 each include an opening delineated by a reinforced peripheral bead 68.

In the present structure, each end wall 68 of the bellows is seated and sealed directly against the vertical metal plate 128 which forms the vertical limb 115. The bead 68 embraces an internal flange 144 which forms a part of a cone-shaped housing 145 projecting externally from the upper portion of the vertical plate 128. The cone-shaped housing is welded as at 146 to form an air seal. As viewed in FIGURE 18, the upper end portion of the diagonal top plate 124 has a semi-circular cut-out 147 which embraces the external surface of the cone-shaped housing, being welded thereto at 127, as noted earlier.

As shown in FIGURE 15, the outer end of housing 145 includes a circular flange 148 welded as at 150 to the housing 145. A cover plate 151 having a gasket 152 is bolted as at 153 to flange 148, to provide an air-tight closure. Each vertical plate 128 includes a rubber bumper 154 secured in position by a retainer ring 155 which is belted as at 156 to the vertical plate. The bumpers of the opposed rockers contact on another and support the weight load when the air spring is collapsed, as noted earlier. The rocking motion of the opposed rockers is limited by a rebound bolt 157 passing through the bumpers, each bolt having a nut and washer 158 which contacts the bumper at the outermost limits of rocker motion. The rocker is shown in its normal load-bearing position in FIGURE 15.

As shown in FIGURES 16 and 17, the air suspension is provided with a height control apparauts, utilizing the principles described earlier with reference to FIGURES 1–12. As shown in FIGURE 17, the undercarriage includes a brake reservoir 160 and an air spring reservoir 161, air pressure being supplied from the tractor by a service line 162 and emergency line 163 which are coupled to the air supply apparatus of the tractor. As described earlier, the emergency line communicates with a relay valve 164 which directs air pressure to the brake reservoir, the valve being responsive to air pressure in the service line 162 to direct air pressure from the brake reservoir to the trailer brakes.

When the air pressure in the brake reservoir 160 reaches a predetermined safe operating value, pressure is directed by way of line 165 to the suspension reservoir 161, a pressure responsive valve 166 being interposed in line 165 for this purpose. Respective branch lines 167 descend from suspension reservoir 161 to the individual height control valves 168 of the air springs. From the height control valves 168, the air pressure is directed by way of the lines 170 to the fittings 171 which communicate with the housing 145 of each air spring.

According to the present disclosure, the height control valves 168 are each mounted upon bracket 172 which is welded to the top plate 124 on one of the rockers. The height control valves are similar to those disclosed in FIGURES 4–6, and each includes an actuating arm 173 pivotally connected as at 174 to a height control rod 175. The opposite end of each control rod is pivotally connected as at 176 to a bar 177 which is welded as at 178 to the opposed rocker.

The operation of the height control apparatus is similar to that disclosed with reference to FIGURES 6–8 and therefore need not be here repeated. It will be apparent that movement of the opposed rockers toward one another, as the load increases, will actuate the air valves in a direction to increase the internal pressure of the air spring so as to re-establish the normal wheel and axle clearance 12 and 18. As the load decreases, causing expansion of the air springs, the excess pressure will be exhausted through the height control valves to re-establish the normal clearances. It will be noted that the respective height control valves operate independently of one another to provide equal running clearances at opposite sides of the vehicle in response to unequal loading or other external forces tending to displace the vehicle body laterally relative to the axles.

Having described my invention, I claim:

1. An air spring suspension system for a vehicle comprising, a load-supporting frame, a pair of tandem axles extending transversely relative to said frame, opposed pairs of suspension rockers disposed relative to the opposite sides of the frame, pivot means extending across the load-supporting frame from one side to the opposite side thereof and pivotally connecting said rockers to the frame, each pair of rockers having opposed spring-engaging portions residing adjacent one another within the confines of the load-supporting frame at opposite sides thereof, a respective air spring interposed directly in compression between said spring-engaging portions of the rockers, said air springs residing within the confines of the load-supporting frame, each pair of rockers having respective axle-engaging portions projecting longitudinally of said frame and in opposite directions from said spring-engaging portions toward said tandem axles and into motion transmitting connection therewith, a strut element forming a part of each rocker, said strut element being diagonally disposed relative to the spring-engaging and axle-engaging portions of the rockers and reinforcing the same, said motion transmitting connections residing at points displaced outwardly in transverse directions from said spring-engaging portions, the weight load of the vehicle being yieldingly biased by said air springs, said outwardly displaced connections providing a stabilizing action transversely relative to the vehicle and axles.

2. An air spring suspension system for a vehicle comprising a load-supporting frame, a pair of tandem axles extending transversely relative to said frame, opposed pairs of suspension rockers disposed relative to the opposite sides of the frame, pivot means extending across the load-supporting frame from one side to the opposite side thereof and pivotally connecting said rockers to the frame, each pair of rockers having opposed generally upright portions spaced from one another and rising above said pivot means, said upright portions residing within the confines of the load-supporting frame in an inboard position, a respective air spring interposed between said opposed upright portions of the rockers, said air springs residing within the confines of the load-supporting frame in an inboard position, each pair of rockers having respective generally horizontal portions projecting longitudinally of the frame and in opposite directions from said upright portions, said horizontal portions being displaced transversely in opposite directions outwardly from said upright portions, shackle means connecting the said horizontal portions of the rockers to said axles, and respective link elements pivotally connected to each of said axles, said link elements projecting outwardly in opposite directions and having outer ends pivotally connected to said vehicle, the weight load of the vehicle being yieldingly biased by said air springs, said outwardly displaced portions of the rockers imparting transverse stability to the vehicle relative to the axles, said link elements locking said axles against rotary motion and adapting the axles to move in response to forces acting relative to the axles and vehicle.

3. An air spring suspension system for a vehicle comprising, a load-supporting frame, a pair of tandem axles extending transversely relative to said frame, a pair of rock shafts extending transversely of the frame and connected at opposite sides to the frame, opposed pairs of suspension levers, each of said levers having a bearing portion journalled along the rock shaft for substantially half the width of the frame, thereby to stabilize the levers transversely, said levers being free to rock individually about said rock shaft, said pairs of levers having opposed generally vertical portions extending from said bearing portions, said vertical portions residing within said confines of the load-supporting frame in an inboard position and having generally horizontal portions extending outwardly in opposite directions from said bearing portions, said horizontal portions being displaced outwardly in transverse directions from said vertical portions in an outboard position relative to the said vertical portions and being connected to said axles, and a compressible air spring interposed between said vertical portions of the levers, said air springs residing within the confines of the load-supporting frame in an inboard position and being free to move bodily relative to said frame, the weight load of the frame being yieldably biased by said air springs in compression between the vertical portions of the levers, whereby impact forces which act upon one lever of a pair are transmitted at least in part through the compressible air spring to the opposed lever of the pair through bodily motion of the air spring relative to the vehicle.

4. A tandem suspension system for a vehicle comprising, a load-supporting frame residing beneath the vehicle, said frame having spaced side members, a pair of axles extending transversely relative to said frame, respective pairs of rockers residing at opposite sides of said frame, pivot means connecting said rockers to said frame at opposite sides, said pivot means extending transversely across said frame, said pivot means having end portions supported by the side member of the frame said rocker elements having transversely extended bearing portions journalled on the said pivot means and thereby stabilized transversely thereon, said rockers being free to rock individually about said pivot means, said pairs of rockers having opposed generally vertical portions rising upwardly from said pivot means and having generally horizontal portions extending longitudinally in opposite directions from said pivot means, said vertical portions residing transversely within the side members of said frame in an inboard position and said horizontal portions residing in respective outboard positions relative to the vertical portions, a strut element forming a part of each rocker, said strut element interconnecting the vertical and horizontal portions of the rockers and reinforcing the same, said horizontal portions being connected to said tandem axles, and respective compressible spring elements interposed between the opposed vertical portions of said rockers, said spring elements residing in an inboard position within said frame, said spring elements being movable bodily relative to said frame, the weight load on said frame being yieldingly biased by said spring elements in compression between the vertical portions of the rockers, whereby impact forces acting upon one rocker of a pair are transmitted at least in part through the compressible spring element to the opposed rocker of the pair through bodily motion of the spring element relative to said frame.

5. An air spring suspension system for a vehicle comprising a load-bearing frame residing beneath the vehicle, a pair of tandem axles extending transversely beneath said frame and spaced downwardly therefrom, a pair of rock shafts extending transversely relative to said frame and secured at opposite sides to said frame, said rock shafts residing parallel with and between said axles, opposed pairs of bell crank levers journalled on said rock shafts, each of said levers having a bearing portion extending transversely along a respective rock shaft substantially half the width of the frame, thereby to stabilize the lever transversely relative to said rock shaft, said pairs of bell crank levers having opposed generally upright limbs rising from said bearing portions and residing within the transverse confines of said frame, said pairs of bell crank levers having generally horizontal limbs extending longitudinally in opposite directions from the respective bearing portions, the outer ends of said horizontal limbs being connected to said tandem axles at points displaced outwardly in opposite directions from said upright limbs, and respective compressible air springs interposed between the upright limbs of said bell crank levers, said air springs being disposed within the transverse confines of the frame above said rock shafts and being free to move bodily relative to the frame, the weight load of the vehicle being yieldingly biased by said air springs in compression between the upright limbs of the bell crank levers.

6. An air spring suspension system for a vehicle having tandem road wheels, comprising a load bearing frame, opposed pairs of suspension rockers residing relative to the opposite sides of the frame, pivot means connecting said rockers to the frame, said rockers being free to rock individually about said pivot means, each pair of rockers having opposed upright limbs spaced from one another and rising above said pivot means, a respective compressible air spring having opposite ends interposed between said opposed upright limbs above the pivot means, spaced bumper elements disposed relative to opposite ends of each air spring and engageable with one another and limiting the compressibility of the air springs, a respective rebound element in operative connection with the opposite ends of each air spring and limiting the expansibility of the air springs, said upright limbs and air springs residing in an inboard position relative to the frame, each pair of rockers having respective longitudinal limbs projecting outwardly in opposite directions from said upright limbs, said longitudinal limbs residing in an outboard position at opposite sides relative to said opposed upright limbs and air springs, and means connecting the outer portions of said longitudinal limbs to said tandem road wheels at relative opposite sides of the vehicle, the weight load of the frame being biased by the respective air springs at opposite sides, said outboard longitudinal limbs imparting lateral stability to the vehicle relative to said road wheels.

7. An air spring suspension system for a vehicle having tandem road wheels comprising, a load-bearing frame residing beneath the vehicle, a pair of rock shafts extending transversely relative to said frame and secured thereto, opposed pairs of rockers journalled on said rock shafts, each of said rockers having a bearing portion extending transversely along said shaft a sufficient distance to stabilize the rocker transversely on said rock shaft, said pairs of rockers having opposed upright limbs rising from said bearing portions and residing within the transverse confines of said frame, said pairs of rockers having longitudinal limbs extending in opposite directions from said bearing portions, means connecting the outer ends of said longitudinal limbs to said tandem rod wheels at points displaced outwardly in opposite directions from said upright limbs, respective compressible air springs having opposite ends interposed between said upright limbs, said air springs being disposed within the transverse confines of the frame and being free to move bodily relative to the frame, and a respective rebound element in operative connection with the opposite ends of each air spring, said rebound elements having stop means engageable with said opposite ends at an outward limit of relative motion, said rebound elements movable bodily with the air spring and limiting expansion thereof, the weight load of the vehicle being yieldingly biased by said air springs in compression between the upright limbs of the rockers and stabilized laterally by said longitudinal limbs.

8. In an air spring suspension system for a vehicle, a frame mounted beneath the vehicle, a pair of tandem axles extending transversely relative to said frame, a pair of rock shafts extending transversely relative to said frame and secured thereto, an opposed pair of rockers journalled on said rock shaft on opposite sides of the frame, each of said rockers having a bearing portion extending along the rock shaft for a distance substantially one-half the width of the frame, thereby to stabilize the rocker transversely on said rock shaft, said pair of rockers having opposed upright limbs rising from said bearing portion within the frame and having longitudinal limbs extending outwardly in opposite directions from said bearing portions in a plane below said frame, the said longitudinal limbs being connected to said axles, and a compressible air spring interposed between said upright limbs within the frame above the rock shafts, the weight load on the frame being yieldably biased by said air spring in compression between said upright limbs of the rockers, said air spring being free to move bodily relative to the frame, whereby impact forces acting upon one rocker is transmitted at least in part to the compressible air spring to the opposed rocker through bodily motion of the air spring relative to the frame.

9. An air spring suspension system for a vehicle comprising, a load bearing frame, a pair of axles extending transversely relative to said frame and spaced vertically therefrom, respective pairs of rockers residing relative to the opposite sides of said frame, pivot means connecting said rockers to said frame, said pairs of rockers having opposed upright portions rising from said pivot means and residing within the confines of said frame, said rockers having longitudinal portions extending in opposite direction from said upright portions and connected to said tandem axles, respective compressible air springs interposed directly in compression between the opposed upright portions of said rockers, said air springs being free to move bodily relative to the frame in response to forces acting on the pair of axles, a respective height control valve mounted relative to one end of each air spring and having a control element in driving connection with the opposite end of the air spring, said valves being in communication with the interior of the air springs, and a flexible air pressure supply conduit communicating with said respective height control valves, said valves supplying air pressure to said air springs in response to compression thereof and exhausting air therefrom in response to expansion of the air springs and thereby maintaining said vehicle at a predetermined vertical spacing relative to said axles.

10. An air spring suspension system for a vehicle comprising, a load-supporting frame residing beneath the vehicle, a pair of axles extending transversely relative to said frame and spaced vertically therefrom, respective pairs of rockers residing at opposite sides of said frame, pivot means connecting said rockers to said frame on opposite sides, said pairs of rockers having upright limbs rising from said pivot means and having longitudinal limbs extending in opposite directions from said pivot means, said upright limbs residing within the transverse confines of said frame in an inboard position, said longitudinal limbs residing in respective outboard positions relative to the upright limbs and being connected to said tandem axles, respective compressible air springs interposed directly in compression between the said upright limbs, a respective height control valve mounted relative to one end of each air spring and having a control element in driving connection with the opposite end of the air spring, said valves being in communication with the interior of said air springs, and air pressure supply means communicating with said respective height control valves, said valves supplying air pressure to said air springs in response to compression thereof and exhausting air therefrom in response to expansion of the air springs and thereby maintaining said frame at a predetermined vertical spacing relative to said axles.

11. An air spring suspension system for a vehicle comprising, a load-supporting frame residing beneath the vehicle, a pair of tandem axles extending transversely relative to said frame and spaced vertically therefrom, respective pairs of rockers residing at opposite sides of said frame, pivot means connecting said rockers to said frame on opposite sides, and providing individual rocking motion of said rockers relative to the frame, said pairs of rockers having opposed spring-engaging portions projecting from said pivot means and having axle-engaging portions extending in opposite directions from said spring-engaging portions, said spring-engaging portions residing within said frame in an inboard position and said axle-engaging portions residing in respective outboard positions relative to the spring-engaging portions and being connected to said tandem axles, respective compressible air springs interposed between the opposed spring-engaging portions of said rockers, a respective height control valve communicating with the interior of each air spring and having a movable control element, each valve and control element having means relatively interconnected with said suspension system, said means relatively shifting said valve and control element in response to changes in the spacing of said axle relative to the frame, and air pressure supply means communicating with said respective height control valves, said valves supplying air pressure to said air springs in response to compression thereof and exhausting air therefrom in response to expansion of the air springs and thereby maintaining said frame at a predetermined vertical spacing relative to said axles.

12. An air spring suspension system for a vehicle comprising, a load-supporting frame, a pair of tandem axles extending transversely relative to the frame, opposed pairs of shiftable suspension rockers disposed relative to the opposite sides of the frame, pivot means connecting said rockers to the frame, said pairs of rockers having upright portions residing adjacent one another and having longitudinal portions extending outwardly from the upright portions and connected to said axles at points displaced outwardly in opposite transverse directions from said upright portions, respective air springs interposed directly in compression between the said upright portions and yieldingly supporting the weight load of the vehicle at an elevation above said axles, said air springs being free to move bodily relative to the frame in response to forces acting on the tandem axles, a respective height control valve communicating with each air spring, each valve having actuating means connected relatively to opposed shiftable portions of the respective pairs of rockers, an air pressure reservoir communicating with said valves, said valves supplying air pressure from said reservoir to the respective air springs in response to compression of the air springs and exhausting air therefrom in response to expansion of the air springs, said height control valves individually maintaining said frame and vehicle at a predetermined elevation relative to said axles at opposite sides of the vehicle.

13. An air spring suspension system for a vehicle comprising, a load-supporting frame, a pair of tandem axles extending transversely relative to said frame, opposed pairs of suspension rockers disposed relative to the opposite sides of the frame, pivot means connecting said rockers to the frame, each pair of rockers having opposed spring-engaging portions residing adjacent one another, within the confines of the load-supporting frame in an inboard position, air springs respectively interposed between said spring-engaging portions of the rockers within the load-supporting frame, each pair of rockers having respective axle-engaging portions projecting in a plane below said frame and in opposite directions from said spring-engaging portions toward said axles and in motion transmitting connection therewith, said axle-engaging portions being displaced outwardly in transverse directions from said spring-engaging portions in an outboard position, a strut element forming a part of each rocker, said strut element interconnecting said spring-engaging and axle-engaging portions of the rockers and reinforcing the same, said air springs yieldingly supporting said vehicle relative to said axles, a pneumatic system including height control valves respectively connected to said air springs for admitting and exhausting air pressure relative to the air springs in response to the weight load of the vehicle, said height control valves maintaining the spring-engaging portions of the rockers in predetermined spaced relationship to one another under various static load conditions of the vehicle.

References Cited in the file of this patent

UNITED STATES PATENTS

| | | |
|---|---|---|
| 1,085,995 | Petter | Feb. 3, 1914 |
| 1,861,866 | Knox | June 7, 1932 |
| 2,025,793 | Tschappat | Dec. 31, 1935 |
| 2,210,485 | Hawkins | Aug. 6, 1940 |
| 2,597,122 | Mullen | May 20, 1952 |
| 2,624,594 | Gouirand | Jan. 6, 1953 |
| 2,702,194 | Alden | Feb. 15, 1955 |
| 2,790,650 | Boschi | Apr. 30, 1957 |
| 2,877,010 | Gouirand | Mar. 10, 1959 |